(12) United States Patent
Gier

(10) Patent No.: US 6,473,983 B1
(45) Date of Patent: Nov. 5, 2002

(54) LEVELING DEVICE

(76) Inventor: Glen R. Gier, 3571 N. 1700 E., Buhl, ID (US) 83316

( * ) Notice: Subject to any disclaimer, the term of this patent is extended or adjusted under 35 U.S.C. 154(b) by 0 days.

(21) Appl. No.: 09/514,228

(22) Filed: Feb. 28, 2000

(51) Int. Cl.[7] ................................................. G01B 3/02
(52) U.S. Cl. ......................................................... 33/613
(58) Field of Search ........................... 33/613, 645, 451, 33/484

(56) References Cited

U.S. PATENT DOCUMENTS

| | | | | |
|---|---|---|---|---|
| 867,556 | A | * 10/1907 | Campbell | 33/451 |
| 3,483,631 | A | * 12/1969 | Bourgeois | 33/645 |
| 4,241,510 | A | * 12/1980 | Radecki | 33/613 |
| 4,648,185 | A | 3/1987 | Brandimarte | 33/451 |
| 5,103,573 | A | * 4/1992 | Ehling et al. | 33/613 |
| 5,867,917 | A | * 2/1999 | Karon | 33/613 |
| 6,029,362 | A | * 2/2000 | Miodragovic | 33/613 |

* cited by examiner

*Primary Examiner*—Christopher W. Fulton
(74) *Attorney, Agent, or Firm*—Robert L. Shaver; Frank J. Dykas; Stephen M. Nipper

(57) ABSTRACT

Disclosed is a tool for marking a pair of points on a horizontal line. The tool has a standard ruler onto which is slidably attached a first member, a leveling member, and a second member. The first member is used to mark the first point and the device pivots at the first member. The user then determines when the first member is level with second member through using the leveling member. When level status is obtained, the user is able to mark the wall or other surface at the second member, thereby resulting in marking pair of points on a horizontal line.

16 Claims, 8 Drawing Sheets

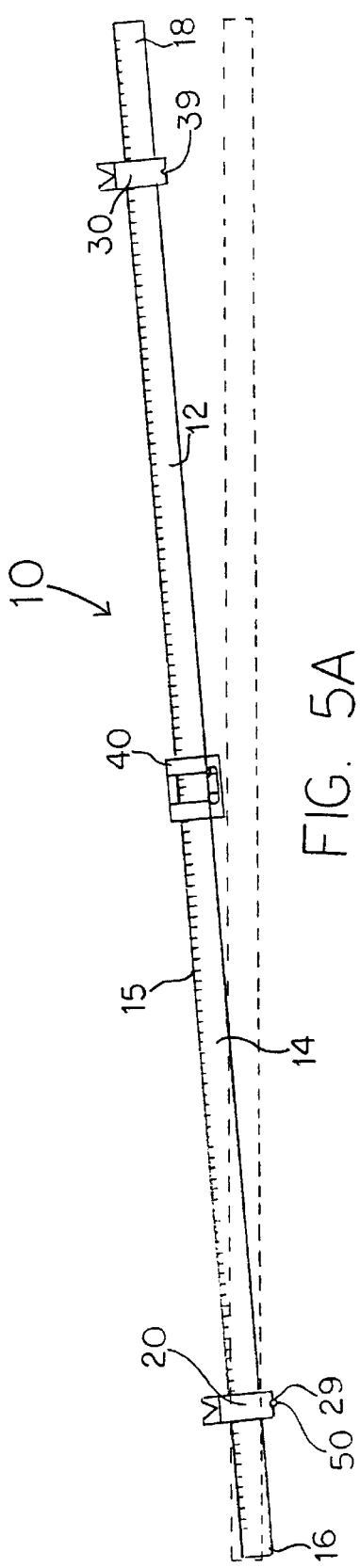
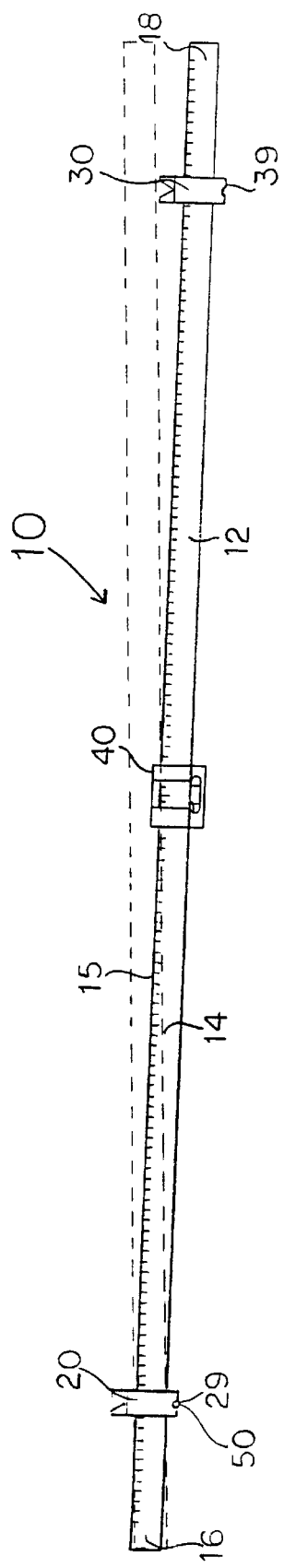
FIG. 5A
FIG. 5B

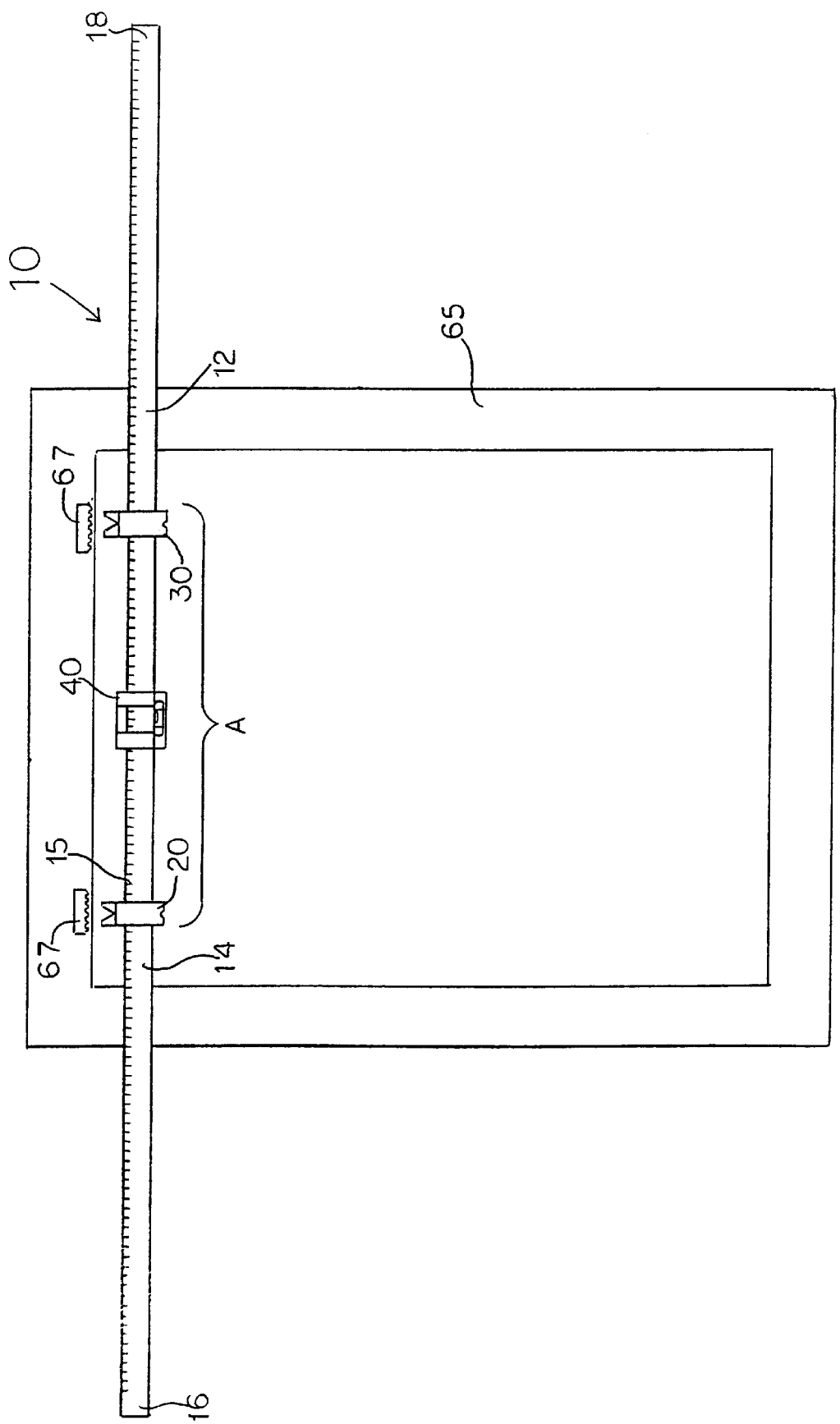

LEVELING DEVICE

BACKGROUND OF THE INVENTION

1. Field of the Invention

The present invention generally relates to devices for accurately marking a pair of points on a horizontal line, and more particularly to devices for assisting in hanging pictures or shelves level.

2. Background Information

A consistent problem in the hanging of pictures and shelves is getting the pictures or shelves hung level. It is also often a challenge to determine the location of wall studs for placement of brackets for hanging shelves. Hanging items level also has a safety concern, as unlevel items are more likely to detach from the wall and fall to the floor in an earthquake or other violent event. At least one other device has been patented for a similar purpose. U.S. Pat. No. 4,648,185 to Brandimarte, discloses a leveling tool for accurately marking a pair of points on a horizontal or vertical line. However, the Brandimarte device has a longitudinally extending guide track, a first fixed tab, and a second movable tab which is able to move within and along the guide track. In use, the device of Brandimarte requires the equivalent of three hands to use it properly. The present device is an improvement over the device of Brandimarte, as will be explained below.

It is a first object of the present invention to provide a simple device for accurately marking a pair of points on a horizontal line. It is another object of the present invention to provide a leveling tool having an adjustable first member and an adjustable second member used to mark the location of the points on the horizontal line.

It is an object of the present invention to provide a means for marking the location of the horizontal point. It is an additional object of the invention to provide a marker for finding and marking horizontal points on a wall which provides a pivot point for the marking device, and which facilitates the two-handed operation of the device.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a tool for marking a pair of points on a horizontal line. The preferred embodiment has three main members: a first member, a second member, and a leveling member. These three members are used with an elongate element. In another embodiment, the tool may comprise a leveling member-first member combination and a second member, used with an elongate element.

The preferred elongate element has a front face, a first end, and a second end. The elongate element is also preferably marked with a measuring scale on the front face.

Referring again to the preferred embodiment, the first member of the present invention attaches to and slides on the elongate element. It is preferred that such attachment be slidable so that the first member can slide along the length of the elongate element. The first member is for positioning at or on the location of the first of the two pair of points. The first member has a front side and a back side with its front side exposed for view on the front face of the elongate element. Extending from the back side of the first member is a first point contact means for contacting the first point. The first point contact means also provides a pivoting point around which the device can rotate, and which stabilizes the use of the device.

The second member also attaches to the elongate element. It is preferred that the second member be slidably attached so that the second member may slide along the length of the elongate element. The second member is used for marking the second of the horizontal points. The second member has a front side and a back side, and its front side is exposed for view on the front face. The back side of the second member has a second point contact means which is extends from the back side, this second point contact means is for determining and marking the location of the second of the points.

The leveling member of the device also attaches to the elongate member. It is preferred that such attachment be slidable so that the leveling member can be slid along the length of the elongate element. The leveling member is used to determine when the first point contact means is level with the second point contact means. The leveling member contains a level determining device, such as a bubble gauge, with the level determining device being exposed for view on the front face so that a user can determine when the two point contact means are level with each other.

The leveling member can be positioned between the first member and the second member, depending on the situation in which it is used.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 5A is an environmental view of one embodiment of the present invention.

FIG. 5B is another environmental view of the embodiment shown in FIG. 5A.

FIG. 6 is another environmental view of an embodiment of the present invention.

DESCRIPTION OF THE PREFERRED EMBODIMENTS

Figure 1:
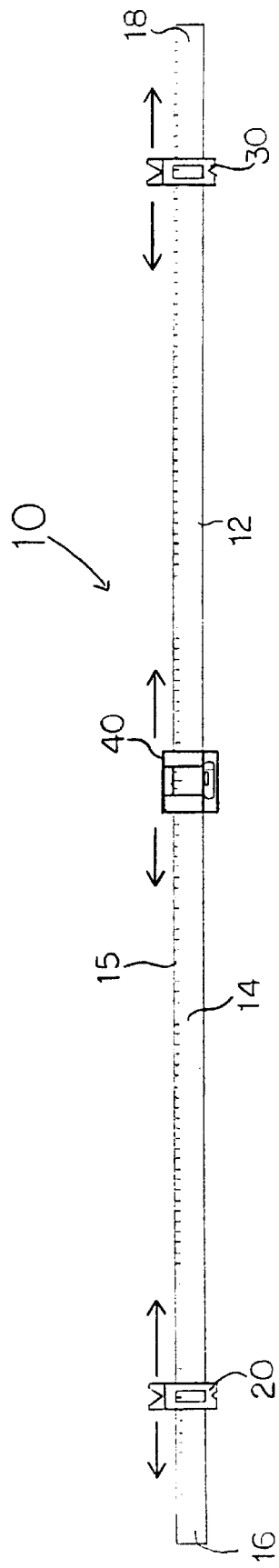
FIG. 1 is a front side view of the preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

While there is shown and described the present preferred embodiment of the invention, it is to be distinctly understood that this invention is not limited thereto but may be variously embodied to practice within the scope of the following claims.

The present invention is a leveling tool for allowing a person to mark a pair of points on a horizontal line or vertical line.

The preferred embodiment of the present invention is shown in FIG. 1. FIG. 1 shows the tool 10 having three distinctly separate members which are used in conjunction with an elongate element 12. The elongate element 12 can be a standard ruler, yardstick, meter stick or other elongate device. The preferred elongate element 12 comprises a metal yardstick, having a plurality of measuring marks or measuring scale 15 extending along its length. The elongate element has a first end 16 extending to a second end 18.

The first member 20 attaches to the elongate element 12. In the preferred embodiment, such attachment is slidable so that the first member 20 may be slid along the length of the elongate element 12. Likewise, the second member 30 attaches to the elongate element 12. It is preferred that the second member 30 also attach in a slidable fashion so that the second member 30 may be slid along the length of the elongate element 12. It is also preferred that the leveling member 40 attach to the elongate element 12. In the preferred embodiment, this attachment is done so that the leveling member 40 may be able to slide along the elongate element 12.

Figure 2B:
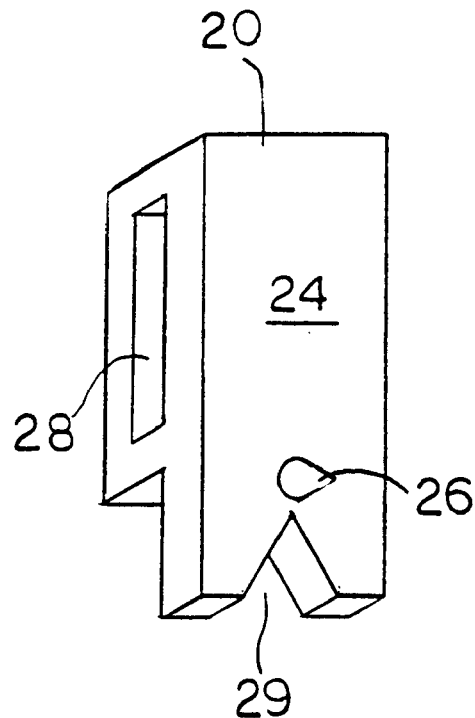
FIG. 2B is a back perspective view of the embodiment of FIG. 2A.
Figure 2A:
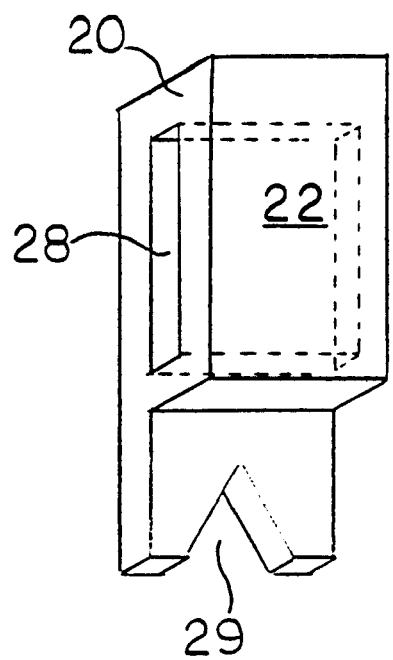
FIG. 2A is a front perspective view of one embodiment of a first member of the present invention.

Referring now to FIG. 2A, one embodiment of the first member 20 of the present invention is shown. The first member 20 has an attachment means 28 for attaching to the elongate element 12. In the preferred embodiment, this attachment means 28 is an orifice through which the elongate element 12 can slide. The first member 20 further has a first member front side 22 and at least one notch 29. This notch 29 is for resting upon a nail or for allowing a user to mark the center location of the first member 20 on a wall or other surface through use of pen, pencil, or other device.

Referring now to FIG. 2B, a back side view of the embodiment shown in FIG. 2A is shown. In this view, we can see that the first member 20 further comprises a first member back side having a first point contact means 26 extending therefrom. This first point contact means 26 can be a pen, nail, screw, or other protrusion for marking the center point of the first member 20.

Figure 3B:
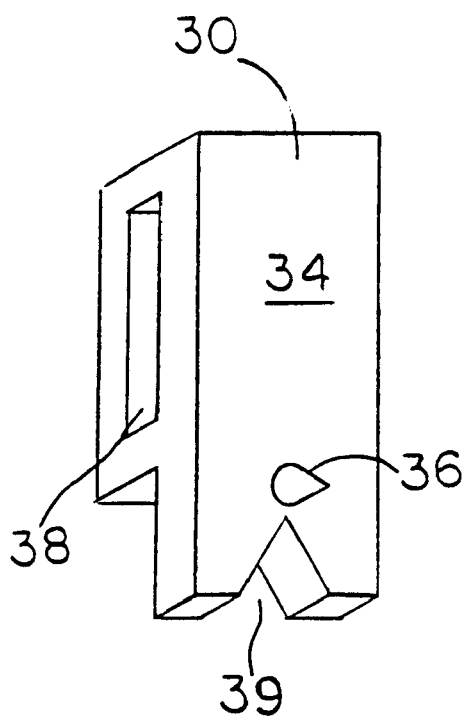
FIG. 3B is a back perspective view of the embodiment of FIG. 3A.
Figure 3A:
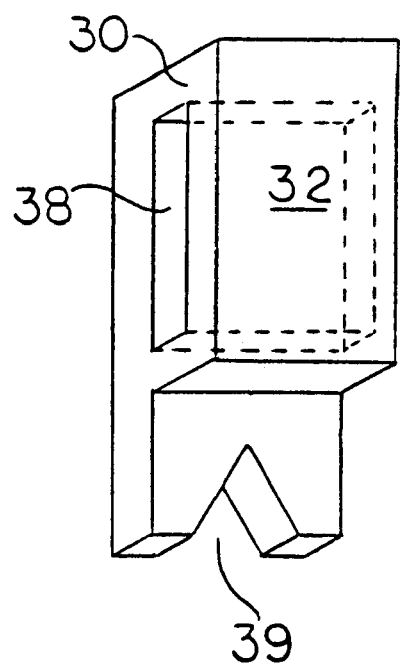
FIG. 3A is a front perspective view of one embodiment of a second member of the present invention.

Referring now to FIG. 3A, a front side view of one embodiment of the second member 30 is shown. Note that in this embodiment the second member 30 is identical to the first member 20 shown in FIGS. 2A and 2B. However, it would be possible to have differently sized, shaped, or functioning first member 20 and second member 30.

FIG. 3B shows the second member 30 having a second member front side 32 and an attachment means 38. As in the first member 20 of the preferred attachment means 38 is an orifice extending there through for receiving the elongate element 12. The second member 30 also comprises a second notch 39 for receiving a nail or marking device.

FIG. 3B shows the reverse side of the second member 30 of FIG. 3A. In this view, the second member back side 34 can be seen. This back side 34 has a second point contact means 36 extending therefrom. While the second point contact means 36 and the first point contact means 26 (of FIG. 2B) is shown centered in the member, it would also be possible to locate the contact means 26, 36 at any position along the member.

Figure 4:
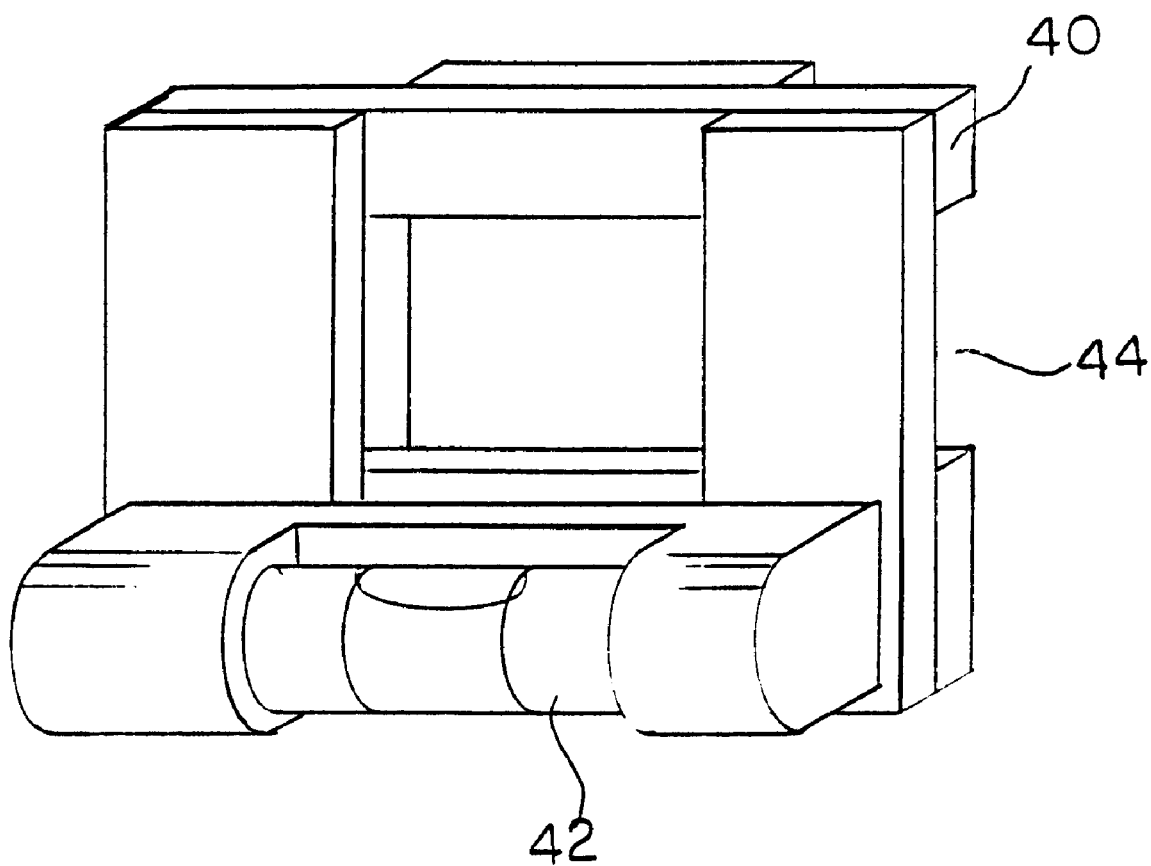
FIG. 4 is a front perspective view of one embodiment of a leveling member of the present invention.

FIG. 4 shows one embodiment of a leveling means 40. In this embodiment, the leveling means 40 comprises a level determining device 42 such as the bubble gauge shown and an attachment means 44 for attaching to an elongate element 12. The leveling member of FIG. 4 would be able to receive therethrough the elongate element 12 so that the leveling member 40 would be able to slide along the elongate element 12.

FIG. 5A shows one embodiment of the present invention 10 in use. In this use, the first member 20, second member 30, leveling member 40 are shown slidably attached to an elongate element 12. In such use, a user would determine a location upon a wall surface where the user desired to locate a first point on the horizontal line. Into that location, the user would drive a nail, screw, or other device 50. Onto this nail 50 would be placed the notch 29 of the first member 20. Thus the elongate element 12, in conjunction with the present invention 10, would be able to pivot at the nail 50 so that the second end 18 may be moved upwards as shown in FIG. 5A or the second end 18 may be moved downwards as shown in FIG. 5B. The user would then be able to move the second end 18 upwards or downwards until the level determining device of the leveling member 40 shows that the first member 20 is level with the second member 30. Then, the user would be able to mark, at the notch 39, the second point on the horizontal line with the nail 50. By using the measuring scale 15 of the elongate element 12, the user would be able to mark these two points at a desired distance apart. Upon removing the present invention 10 from the wall surface, the user would be able to attach another fastener, such as a nail or screw, at the location the mark was made on the wall, resulting in a second fastener which is located on a horizontal line with the first fastener 50.

Referring now to FIG. 6, the user could use the present invention 10 to determine the desired distance between the first and second points. Shown in FIG. 6 is a standard picture frame 65. This picture frame 65 has two brackets 67 for receiving fasteners. The user could place the present invention 10 adjacent to these brackets 67, thereby determining the proper spacing of fasteners to be made in the wall. The proper spacing is denoted through use of the letter "A" in FIG. 6. The user, knowing "A," would then position the device on the wall to mark two points as shown in FIGS. 5A and 5B.

Figure 7:
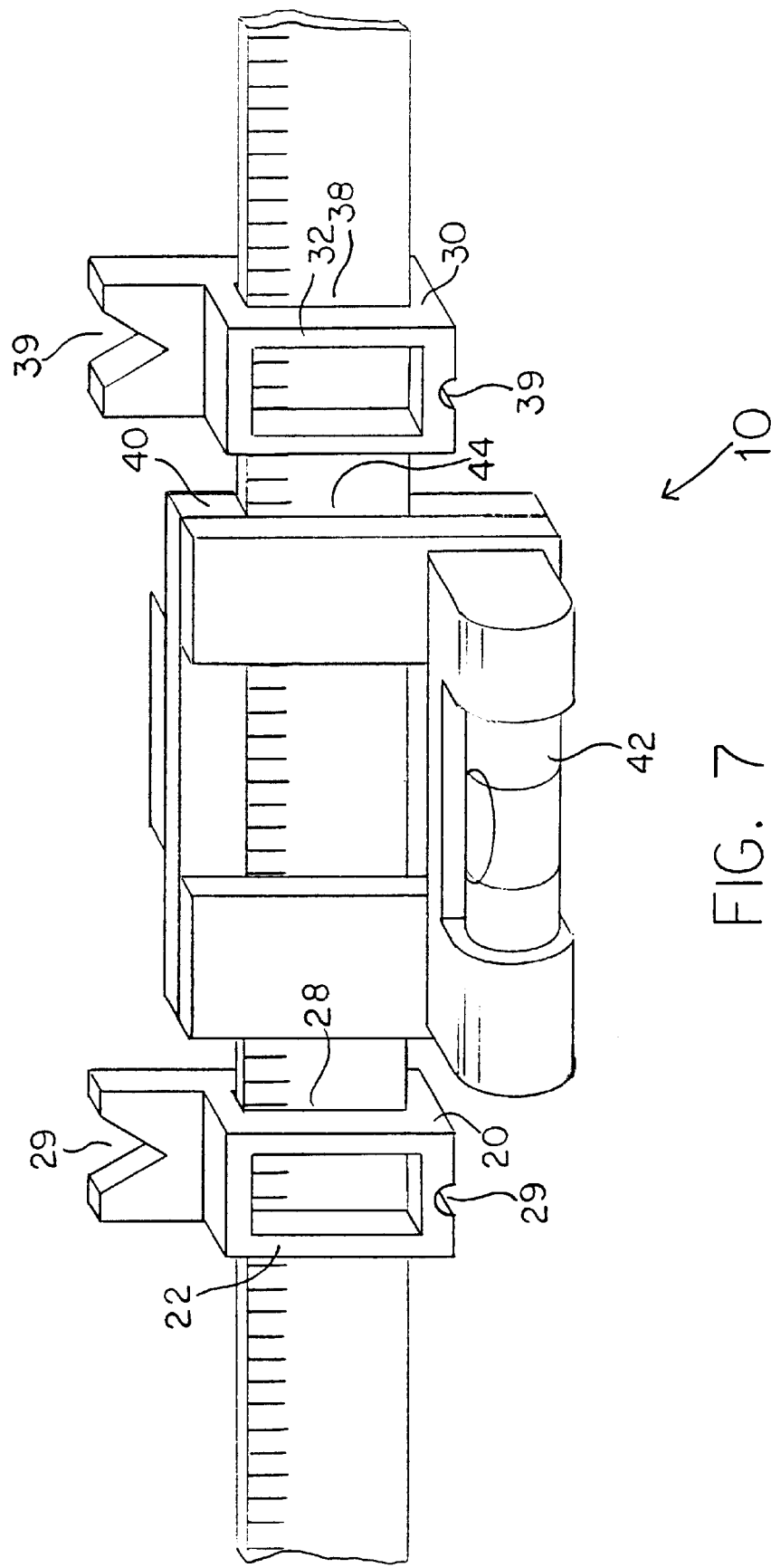
FIG. 7 is a partial, perspective view of another embodiment of the present invention.

Now referring to FIG. 7, FIG. 7 shows another embodiment of the present invention 10. This embodiment shows the first and second members 20, 30 having holes therethrough for allowing the user to better view the measuring scale 15. Also on this view, this embodiment has notches 29 and 39 located at both the top and bottom ends of the first and second members 20, 30.

Figure 8:
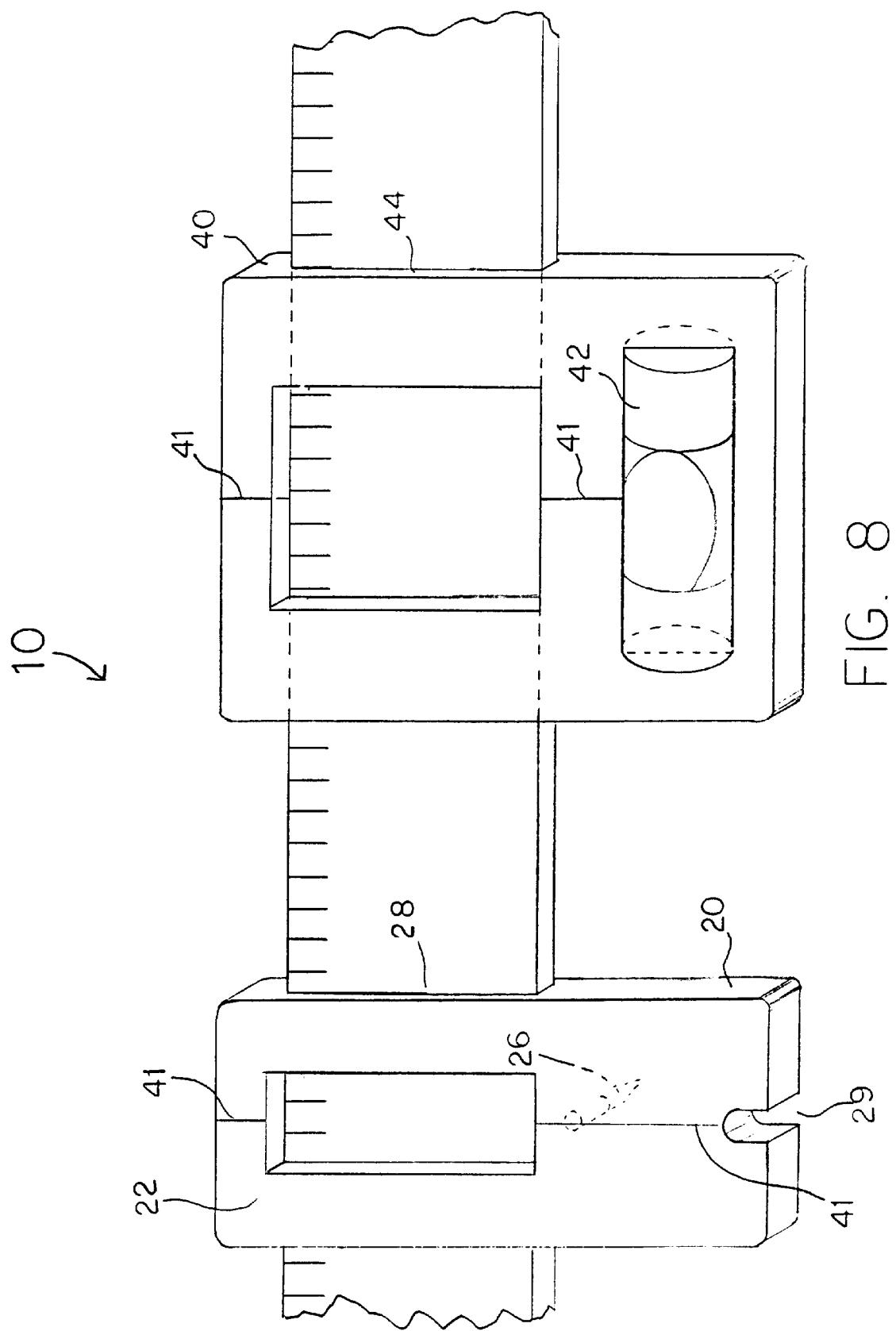
FIG. 8 is a front perspective view of another embodiment of the present invention.

FIG. 8 shows yet another embodiment of the present invention. In this embodiment, one can see the centering lines 41 that are used to help the user determine where exactly along the measuring scale 15 the center of the first member 20 or the leveling member 40 is located. In this embodiment, it would be preferred that the second member 30 (not shown) be substantially identical to the first member 20. For centering a mark, within first member 20 or second member 30, a projecting marker, tab or pointer could also be used instead of centering line 41.

It is also understood that the functions of the first member 20 and the second member 30 are completely interchangeable. This allows placement of the first member 20 the second member 30 and the sliding leveling member 40 in various combinations along the elongated member 12. This allows the first member 20 to be placed proximate to the second member 30 and the sliding level member 40 to be place proximate to second member 30. Each of these portions can then be slid along the elongated portion 12 to achieve the desired locations. This is a particularly useful feature when working in a location where placement of the level may be awkward such as working in a corner, or in a situation where the distance between the holes is less than the length of the sliding member. This feature also allows the second member 30 to be placed in a position along the elongate element 12 whereby the point contact means of the second member 36 lies on the opposite side of the elongated portion from the first point contact means 26. When the leveling means signifies that the line of the elongated member 12 is level, the line connecting the first point means 26 and the second point means 36 is at a 45° angle to the direction of the level line.

Figure 9:
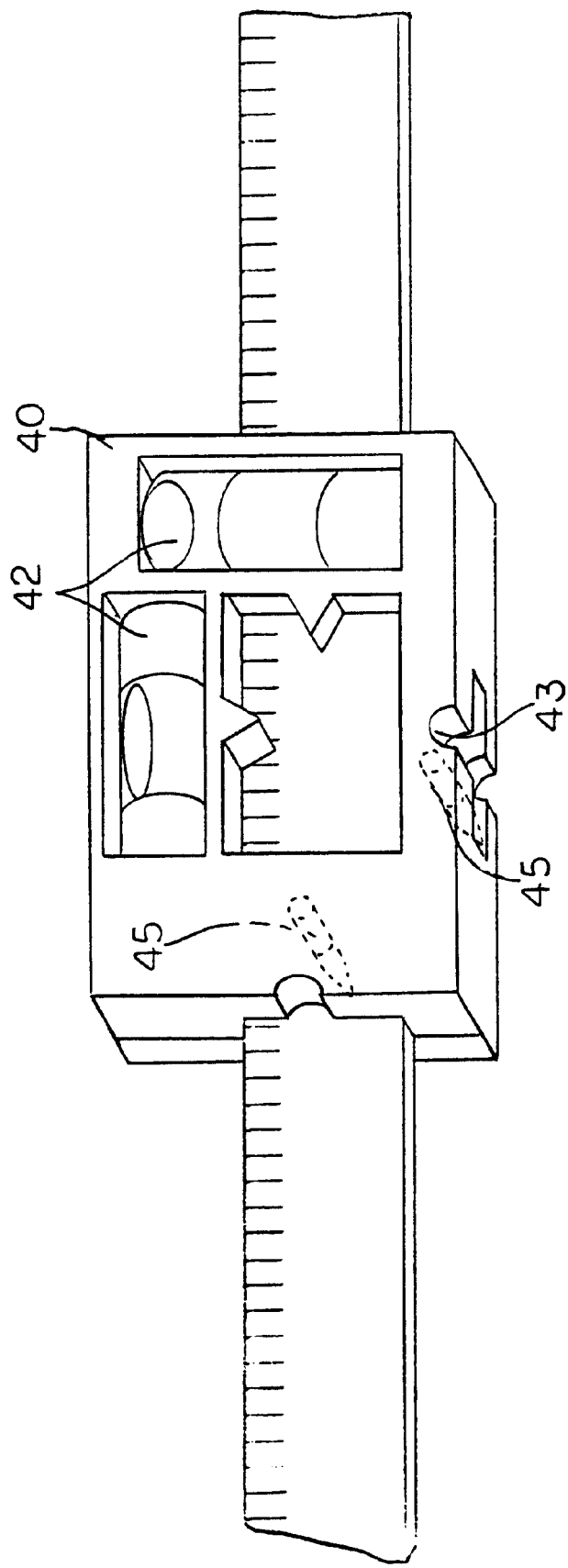
FIG. 9 is a front perspective view of one embodiment of the first member/leveling member combination of one embodiment of the present invention.

Referring now to FIG. 9, FIG. 9 shows another embodiment of the leveling member 40 of the present invention. In this embodiment, the leveling member 40 actually comprises a combination of either the first member or the second member and the leveling member 40. As such, the leveling member has a point contact means 45 and a notch 43. In this embodiment, it would also be preferred to locate the level determining device 24 at the top of the leveling member 40, however such a location is not required.

A standard ruler could be used as the elongate element 12. In such an embodiment, the user could utilize his own ruler in conjunction with the present invention to create such a leveling device. The user would then be able to strip off and store the present invention when not needed so that he or she could use his ruler for other purposes.

The ruler itself could contain a level determining device, thereby eliminating the necessity of having a slidably attachable leveling member 40.

The device 10 could also be used to determine vertical level. For this purpose, a level determining device which can be mounted in either of two axis's allows to be used for vertical or horizontal use.

While there is shown and described the present preferred embodiment of the invention, it is to be distinctly understood that this invention is not limited thereto but may be variously embodied to practice within the scope of the following claims. From the foregoing. description, it will be apparent that various changes may be made without departing from the spirit and scope of the invention as defined by the following claims.

I claim:

1. A tool for marking a pair of points on a horizontal line comprising: an elongate element having a front face; a first end and a second end; a first member slidably attached to said elongate member, said first member for positioning on the first of said points, said first member further comprising a front side and a back side, said first member front side exposed for view on said front face, said first member back side having extending therefrom a first point contact means; a second member slidably attached to said elongate member, said second member for locating and marking the second of said points, said second member further comprising a front side and a back side, said second member front side exposed for view on said front face, said second member back side having extending therefrom a second point contact means; and a slideable leveling member attached to said elongated member for determining when the first member is level with the second member, said leveling member containing a level determining device, said level determining device exposed for view on said front face.

2. The tool of claim 1 wherein said first member is positioned towards said first end, wherein said second member is positioned towards said second end and wherein said leveling member is positioned between said first member and said second member.

3. The tool of claim 1 wherein said first member further comprises a top end having a notch for allowing a user to mark a location of said first member on an object.

4. The tool of claim 1 wherein said first and second members further comprise top ends having notches for allowing a user to mark a location of said first and second members on an object.

5. The tool of claim 1 wherein said elongate element is marked with a measuring scale on said front face.

6. A tool for marking a pair of points on a line, said tool for use with an elongate element having a front face, a first end and a second end, said tool comprising: a first member having a point protrusion slidably attached to said elongate member, said first member for positioning on one of said points; a second member having a point protrusion slidably attached to said elongate member, said second member for positioning on one of said points; and a leveling member slidably attached to said elongated member for determining when the first member is level with the second member, said leveling member containing a bubble gauge, said bubble gauge exposed for view on said front face.

7. The tool of claim 6 wherein said first member positioned towards said first end, wherein said second member is positioned towards said second end and wherein said leveling member is positioned between said first member and said second member.

8. The tool of claim 6 wherein said first member is positioned towards said first end, wherein said second member is positioned towards said second end.

9. The tool of claim 8 wherein said back side has extending therefrom a first point contact means.

10. The tool of claim 8 wherein said first member further comprises a top end having a notch for allowing a user to mark the location of said first member on an object.

11. The tool of claim 10 wherein said back side has extending therefrom a second point contact means.

12. The tool of claim 10 wherein said second member further comprises a top end having a notch for allowing a user to mark the location of said second member on an object.

13. The tool of claim 6 wherein said first member further comprises a front side and a back side, said front side exposed for view on said front face.

14. The tool of claim 6 wherein said second member further comprises a front side and a back side, said front side exposed for view on said front face.

15. A tool for marking a pair of points on a horizontal line comprising: an elongate element having a front face, a first end and a second end, wherein said elongate element is marked with a measuring scale on said front face; a first member slidably attached to said elongate member, said first member for positioning of the first of said points, said first member further comprising a front side and a back side, said first member front side exposed for view on said front face, said first member back side having extending therefrom a first point contact means; a second member slidably attached to said elongate member, said second member for marking the second of said points, said second member further comprising a front side and a back side, said second member front side exposed or view on said front face, said second member back side having extending therefrom a second point contact means; and a leveling member slidably attached to said elongate member for determining when the first member is level with the second member, said leveling member containing a level determining device, said level determining device exposed for view on said front face; wherein said first member is adjacent to the first end and the second member is adjacent to the second end, wherein said first member is held at a first nailing position upon a wall surface, wherein said tool pivots on said wall surface at said first point contact means, wherein said first point contact means is pressed into said wall surface thereby creating a first mark, wherein said second end moved until said level determining device shows that the elongated member is level, wherein said second member is the located at a second nailing position, wherein said second point contact means is pressed is to said wall surface thereby creating a second mark, wherein said tool is removed from said wall surface and a pair of fasteners are attached to said wall surface at said first and second marks.

16. A tool for marking a pair of points on a horizontal line comprising: an elongate element having a front face, a first end and a second end; a first member slidably attached to said elongate member, said first member for positioning on the first of said points, said first member further comprising a front side and a back side, said first member front side exposed for view on said front face, said first member back side having extending therefrom a first point protrusion; a second member slidably attached to said elongate member, said second member for locating and marking the second of said points, said second member further comprising a front side and a back side, said second member front side exposed for view on said front face, said second member back side having extending therefrom a second point protrusions; and a slidable leveling member attached to said elongated member for determining when the first member is level with the second member, said leveling member containing a level determining device, said level determining device exposed for view on said front face.

* * * * *